(12) United States Patent
Tedesco et al.

(10) Patent No.: US 7,692,786 B2
(45) Date of Patent: Apr. 6, 2010

(54) RAMAN PROBE CONFIGURED FOR LOW-CONCENTRATION MEASUREMENTS

(75) Inventors: James M. Tedesco, Livonia, MI (US); Joseph B. Slater, Dexter, MI (US)

(73) Assignee: Kaiser Optical Systems, Ann Arbor, MI (US)

( * ) Notice: Subject to any disclaimer, the term of this patent is extended or adjusted under 35 U.S.C. 154(b) by 137 days.

(21) Appl. No.: 11/873,718

(22) Filed: Oct. 17, 2007

(65) Prior Publication Data

US 2008/0180663 A1 Jul. 31, 2008

Related U.S. Application Data

(60) Provisional application No. 60/862,109, filed on Oct. 19, 2006.

(51) Int. Cl.
*G01J 3/44* (2006.01)
*G01N 21/65* (2006.01)

(52) U.S. Cl. ............................................ 356/301
(58) Field of Classification Search ............... 356/301
See application file for complete search history.

(56) References Cited

U.S. PATENT DOCUMENTS

| 3,802,777 | A | 4/1974 | Regnier et al |
| 5,311,021 | A | 5/1994 | Messerschmidt |
| 5,329,353 | A | 7/1994 | Ichimura et al. |
| 5,450,193 | A | 9/1995 | Carlsen et al. |
| 5,842,995 | A | 12/1998 | Mahadevan-Jansen et al. |
| 5,956,138 | A | 9/1999 | Slater |
| 6,654,119 | B1* | 11/2003 | Gould et al. ............ 356/318 |
| 6,907,149 | B2 | 6/2005 | Slater |
| 2003/0053048 | A1* | 3/2003 | Bennett et al. .......... 356/301 |

* cited by examiner

*Primary Examiner*—F. L Evans
(74) *Attorney, Agent, or Firm*—Gifford, Krass, Sprinkle, Anderson & Citkowski, P.C.

(57) ABSTRACT

Raman measurement apparatus optimized for gaseous and other low-concentration samples includes a focusing objective that uses only first-surface mirrors instead of lenses, thereby dramatically reducing background noise. In the preferred embodiment, the focusing and collimation functions performed by the objective section are performed by an off-axis parabolic mirror. A spherical first-surface mirror opposing the parabolic mirror re-images the counter-propagating beam back through the same focus for re-collimation by the parabolic mirror. A probe-head section operative to generate the counter-propagating beam has substrates and surfaces arranged such that the excitation beam does not pass through any substrates after it is filtered by the bandpass coating, thereby further decreasing background signals. Additionally, when the objective section includes the opposing spherical mirror, the excitation beam is collected substantially in its entirety and neutralized out of the collection path by the probe-head section.

9 Claims, 2 Drawing Sheets

RAMAN PROBE CONFIGURED FOR LOW-CONCENTRATION MEASUREMENTS

REFERENCE TO RELATED APPLICATION

This application claims priority from U.S. Provisional Patent Application Ser. No. 60/862,109, filed Oct. 19, 2006, the entire content of which is incorporated herein by reference.

FIELD OF THE INVENTION

This invention relates generally Raman spectroscopy and, in particular, to a focusing objective that uses only first-surface mirrors, thereby facilitating the measurement of low-concentration "trace" elements in solids, liquids and gases.

BACKGROUND OF THE INVENTION

Conventional wisdom holds that Raman spectroscopy is a technique suited to the analysis of moderate-to-high concentration materials in solid or liquid form. Raman scattering is such a weak effect that one needs to be analyzing a high concentration analyte in order for the signal to be measurable over the inherent noise of other material in which it might be embedded, or the inherent fluorescence background noise of the instrument itself, particularly in the case of fiber-coupled Raman probes. Accordingly, Raman has not generally been considered an appropriate analytical technique for low-concentration "trace" elements in solids or liquids, or particularly for measuring gasses in just about any meaningful concentration, let alone trace levels. While certain trace concentration measurements have been made, they have been with direct-coupled Raman equipment, not industrial-compatible fiber-coupled instrumentation.

SUMMARY OF THE INVENTION

This invention resides in Raman measurement apparatus optimized for gaseous and other low-concentration samples. In the preferred embodiment, the focusing objective uses only first-surface mirrors instead of lenses, thereby dramatically reducing background signal noise and unwanted artifacts.

High-sensitivity Raman measurement apparatus according to the invention operates on a counter-propagating beam combining a laser excitation beam and a Raman collection beam. The objective section is operative to focus the counter-propagating beam onto a sample of interest and to collimate the Raman spectra received therefrom. The objective section uses only first-surface mirrors to perform the focusing and collimation functions, thereby minimizing unwanted background signals.

In the preferred embodiment, the focusing and collimation functions performed by the objective section are performed by an off-axis parabolic mirror. To enhance performance, the apparatus further includes a spherical first-surface mirror opposing the parabolic mirror to re-image the counter-propagating beam back through the same focus for re-collimation by the parabolic mirror.

A more complete system includes a probe-head section coupled to excitation and collection optical fibers. The probe-head section includes a laser bandpass filter substrate with a coating to filter the excitation beam, a combiner substrate with a coating to merge the filtered excitation and collection beams into the counter-propagating beam, and a fold mirror substrate with a coating to direct the filtered excitation beam onto the combiner. The excitation beam does not pass through any of the substrates after it is filtered by the bandpass coating, thereby further decreasing the generation of background signals. Additionally, when the objective section includes the opposing spherical mirror, the excitation beam is collected substantially in its entirety and redirected by the combiner coating and fold mirror coating back through the laser bandpass filter coating, thereby avoiding background signals otherwise generated by the combiner and fold mirror substrates.

DETAILED DESCRIPTION OF THE INVENTION

Figure 1A:
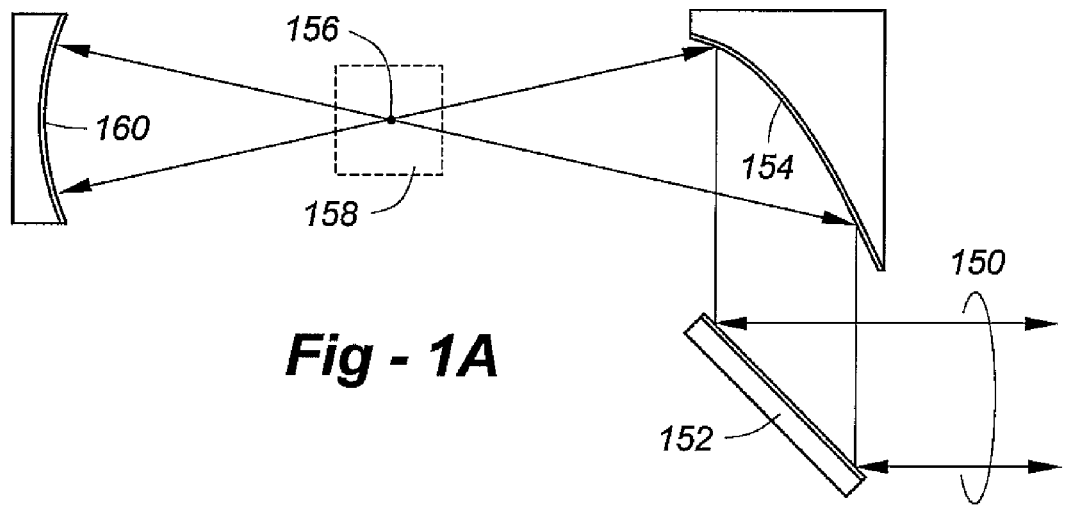
FIG. 1A is a simplified ray diagram of a focusing objective according to a preferred embodiment of the invention.
Figure 1B:
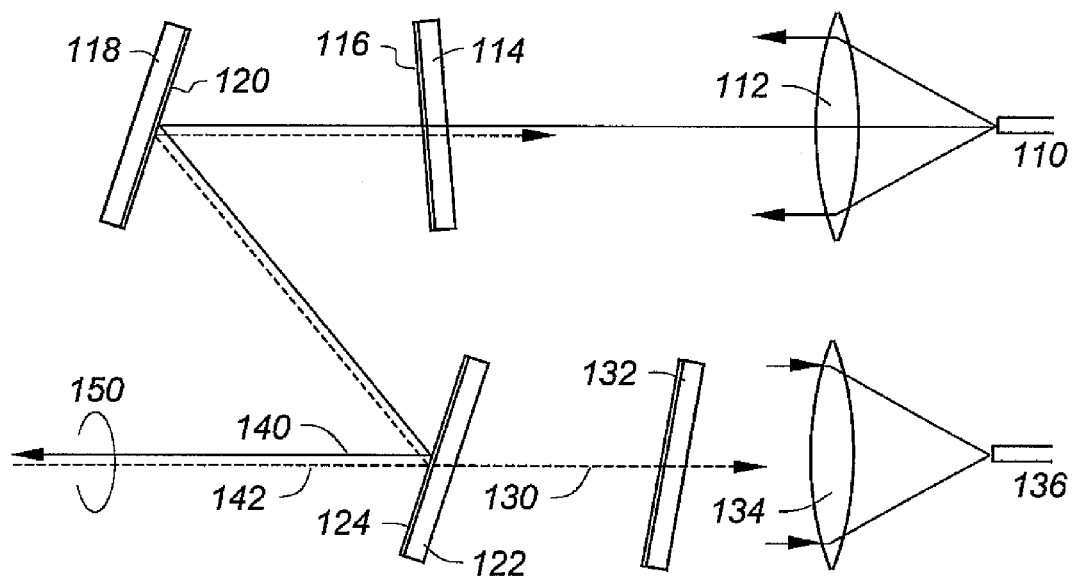
FIG. 1B is a simplified ray diagram of a Raman probe head section with reflector and filter coating orientations configured to reduce background noise.

The basic layout of a system according to the invention is shown in FIGS. 1A and 1B. For convenience of description, the probe is divided into two sections: the focusing objective (FIG. 1A) and the probe head section (FIG. 1B). The function of the focusing objective is to focus the laser, and to collect the Raman scattered signal from that same focus. In the preferred embodiment of this invention the focusing objective has no "lenses"—only first-surface mirrors. Referring to FIG. 1A, it is presumed that the objective section receives a collimated co-propagating excitation/collection beam 150 from the probe head section described in further detail below. A first focusing mirror 154, preferably an off-axis parabola, focuses the collimated beam. A second mirror 160, preferably having a spherical surface, re-images the beam back through the same focus 156 within sample 158, whereupon it is re-collimated by the first mirror (the off-axis parabola) and returned back to the probe head. The fold mirror 152 is a design detail and not critical to the invention.

The configuration shown in FIG. 1A has multiple distinct advantages, particularly for gas-phase analysis. Because the gas sample is typically very optically clear, the second focus on the return path effectively doubles the laser excitation power. Furthermore, the collection aperture for the Raman scatter signal is also effectively doubled, because scatter in the direction of the return mirror will also be collected and imaged back to the collection fiber. The net effect is a theoretical 4× improvement in Raman signal relative to the same optics without the confocal return mirror. This has been described previously in U.S. Pat. No. 5,956,138, also incorporated herein by reference in its entirety.

FIG. 1B is a diagram of a probe-head section applicable to the invention with the understanding that the focusing objective may be used in conjunction with any appropriate low-noise fiber-coupled probe head capable of handling counter-propagating excitation and collection beams. Laser light from excitation fiber 110 is collimated by lens 112 and bandpass filtered by coating 116 on substrate 114. A fold mirror coating on substrate 118 redirects the light onto combiner coating 124 on substrate 122, which forms co-propagating beam 150 containing excitation beam 140 and Raman collection signal 142. The collection signal passes through combiner 124, 122 as beam 130, which is notch filtered by element 132 and focused by lens 134 onto the input of collection fiber 136.

The basic function of each element is described in detail in U.S. Pat. No. 6,907,149, the entire content being incorporated herein by reference. However, in the preferred embodiment of this invention, specific orientations of the coated surface on each layer of the probe head section are used to further minimize noise. In particular, the reflective and filter coatings 116, 120, and 124 in FIG. 1B are oriented such that the excitation laser beam never passes through substrate 114, 118 or 122 after being filtered by bandpass coating 116. This prevents the generation of background from such substrates that are visible to the collection path. Such backgrounds easily dominate the weak collection signals of interest.

A further benefit of the invention is the capture and control of the laser excitation beam. Unlike the typical Raman probe objective, the configuration of FIG. 1A does not allow the expanding laser beam (and corresponding collection path) to intersect any adjacent surfaces, such as the inside of a process pipe or reactor vessel, or even a wall several feet away. Background signals from such surfaces can easily be strong enough to obscure the typically very weak signals from the target gas being measured.

Instead, the laser is fully collected and returned to the probe head section of FIG. 1B. The combiner 124, 122 and fold mirror 120, 118 reflects nearly all of the returned laser energy to the bandpass filter 116, 114, generating no substrate backgrounds along the way. After traversing the bandpass coating 116, the laser (broken line) will generate a large background in the bandpass substrate 114, the excitation lens 112, and particularly at the excitation fiber 110 and ferrule where it is refocused. Importantly, however, these background signals cannot get back out through the bandpass filter coating to be in view of the collection path. Thus, the laser is effectively "dumped" to a location where the surfaces it hits can cause no collected background to obscure the desired signal.

The various mirror and filter coatings are also constructed of low-background materials. We have found a wide variety of both suitable and unsuitable reflector and filter coatings, both dielectric and metallic. Dielectric filter coatings should be made of high-purity coating layers. Protected metal mirrors, such as protected or enhanced aluminum, should be made with attention to 1) minimizing the thickness of and 2) maximizing the purity of the protection or enhancement dielectric layers.

Figure 2:
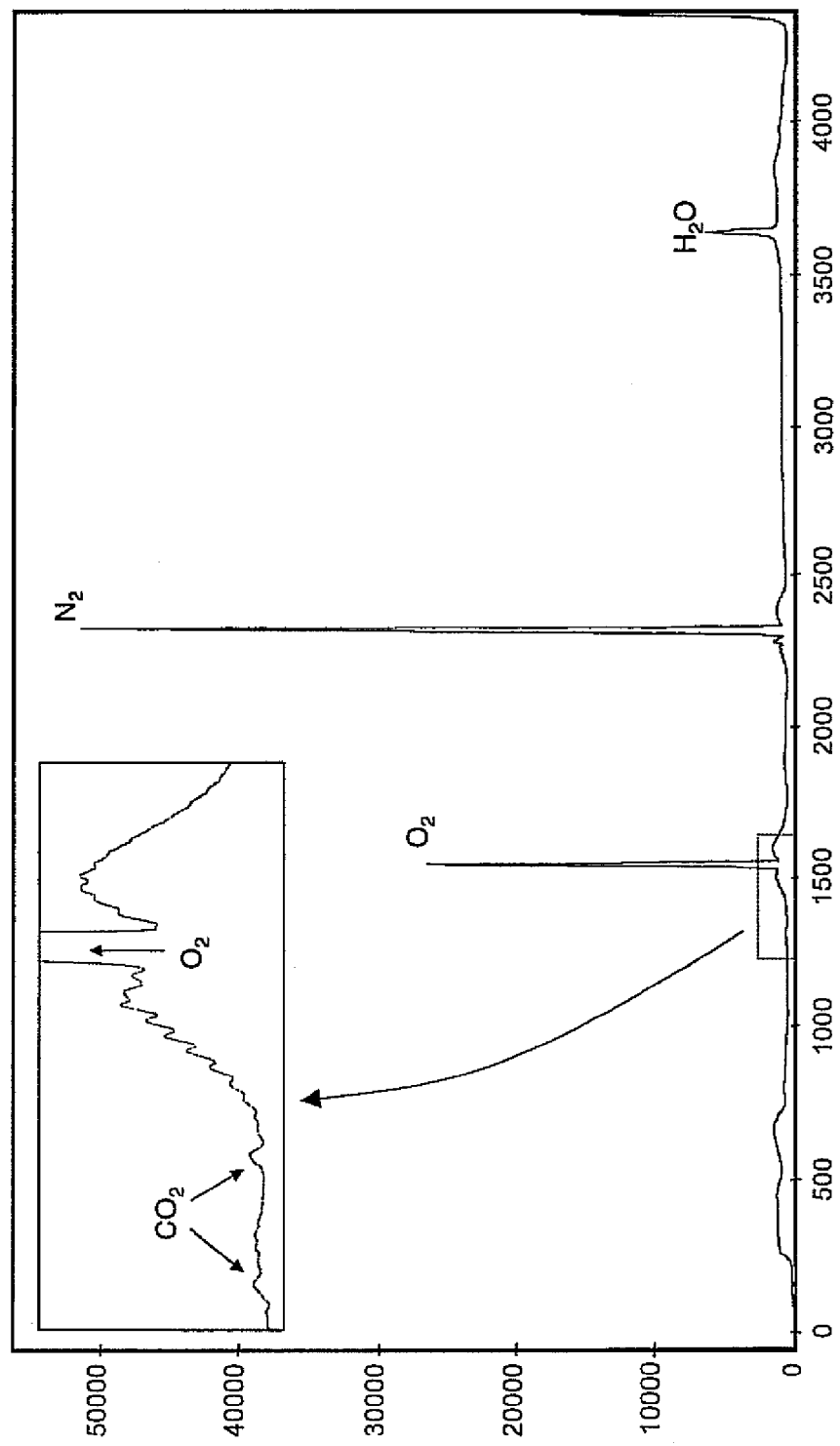
FIG. 2 shows a spectrum of air measured with a commercially available 40 mW 532 nm laser.

A first-order performance benchmark for a widely useful Raman trace gas analyzer is to "see" the signature of carbon dioxide in air with an acquisition time of 10 minutes or less. $CO_2$ is indeed a trace element in air, comprising only about 0.03% by volume. The present invention meets this performance benchmark. FIG. 2 shows a spectrum of air measured with a commercially available 400 mW 532 nm laser using the benchmark 10-minute acquisition. The dominant features of this spectrum are simply oxygen, nitrogen, and water (humidity). The blow-up in the figure shows the clearly distinguishable $CO_2$ peaks adjacent to the $O_2$ sidebands.

We claim:

1. High-sensitivity Raman measurement apparatus operating on a counter-propagating beam combining a laser excitation beam and a Raman collection beam, comprising:
   an objective section including an off-axis parabolic mirror operative to focus the counter-propagating beam within a sample of interest and collimate the Raman spectra received therefrom; and
   a spherical first-surface mirror opposing the parabolic mirror, the spherical mirror being operative to re-image the counter-propagating beam back through the same focus for re-collimation by the parabolic mirror.

2. The apparatus of claim 1, further including a probe-head section, comprising:
   a laser bandpass filter substrate with a coating to filter the excitation beam,
   a combiner substrate with a coating to merge the filtered excitation and collection beams into the counter-propagating beam, and
   a fold mirror substrate with a coating to direct the filtered excitation beam onto the combiner; and
   wherein the excitation beam does not pass through any of the substrates after it is filtered by the bandpass coating.

3. The apparatus of claim 2, wherein probe-head section is coupled to optical fibers carrying the excitation and collection beams.

4. The apparatus of claim 1, further including a probe-head section, comprising:
   a laser bandpass filter substrate with a coating to filter the excitation beam,
   a combiner substrate with a coating to merge the filtered excitation and collection beams into the counter-propagating beam, and
   a fold mirror substrate with a coating to direct the filtered excitation beam onto the combiner; and
   wherein the excitation beam is collected substantially in its entirety from the objective section and redirected by the combiner coating and fold mirror coating back through the laser bandpass filter coating, thereby avoiding background signals otherwise generated by the combiner and fold mirror substrates.

5. The apparatus of claim 4, wherein probe-head section is coupled to optical fibers carrying the excitation and collection beams.

6. High-sensitivity Raman measurement apparatus, comprising:
   a probe-head section coupled to an excitation optical fiber carrying a laser excitation beam and a collection optical fiber carrying a Raman collection beam, the probe-head section including:
      a laser bandpass filter substrate with a coating to filter the excitation beam,
      a combiner substrate with a coating to merge the filtered excitation and collection beams into a counter-propagating beam, and
      a fold mirror substrate with a coating to direct the filtered excitation beam onto the combiner; and
   an objective section operative to focus the counter-propagating beam through a sample of interest and collimate the Raman spectra received therefrom; and wherein:
   the excitation beam does not pass through either of the substrates after it is filtered by the combiner and fold mirror bandpass coating, and
   the objective section uses only first-surface mirrors to perform the focusing and collimation functions.

7. The apparatus of claim 6, wherein the focusing and collimation functions are performed by an off-axis parabolic mirror.

8. The apparatus of claim 6, wherein:
   the focusing and collimation functions are performed by an off-axis parabolic mirror; and
   further including a spherical first-surface mirror opposing the parabolic mirror, the spherical mirror being operative to re-image the counter-propagating beam back through the same focus for re-collimation by the parabolic mirror.

9. The apparatus of claim 6, wherein the excitation beam is collected substantially in its entirety from the objective section and redirected by the combiner coating and fold minor coating back through the laser bandpass filter coating, thereby avoiding background signals otherwise generated by the combiner and fold mirror substrates.

* * * * *